June 24, 1930  D. M. SOLENBERGER  1,767,711
PISTON RING
Filed Oct. 29, 1928
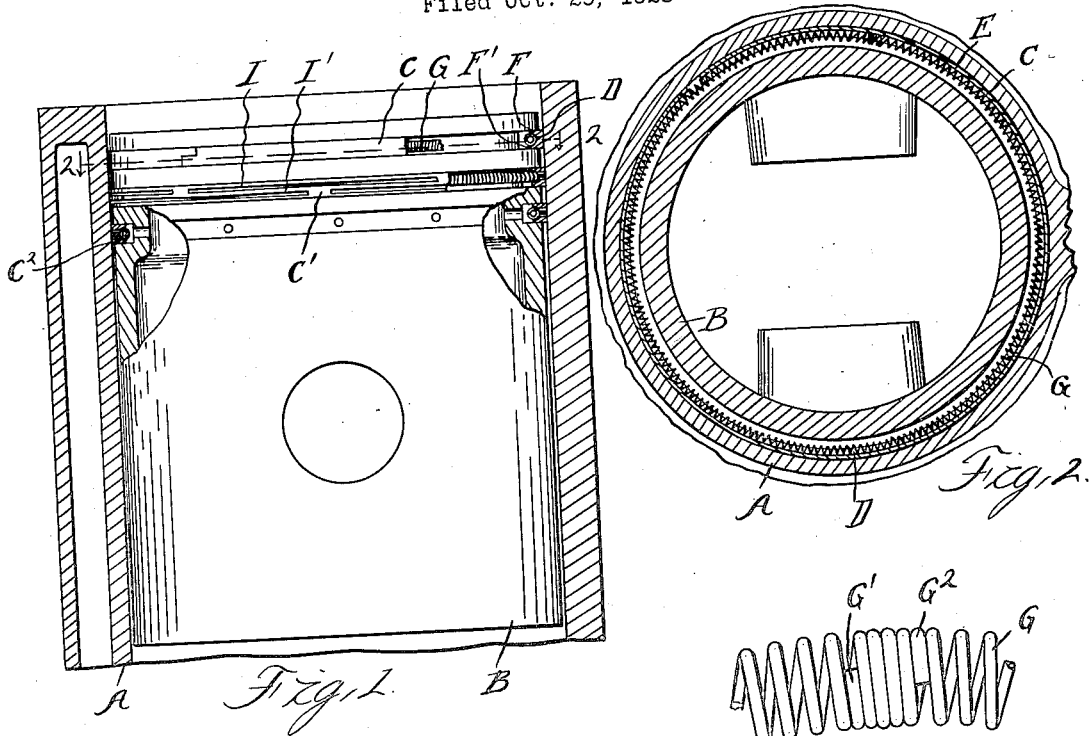
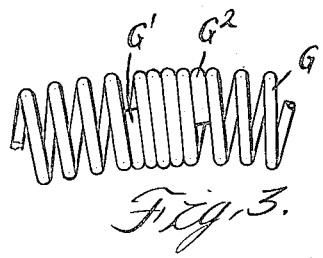
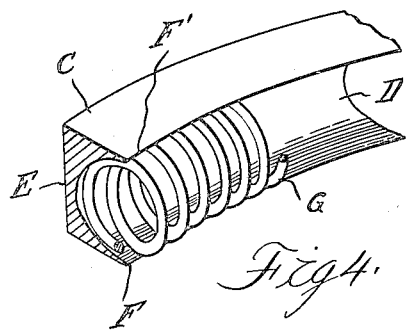
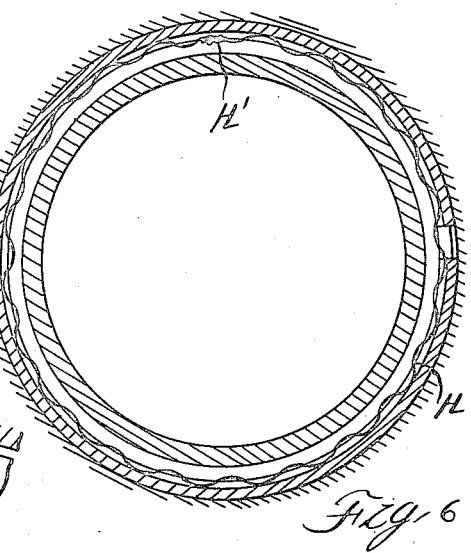
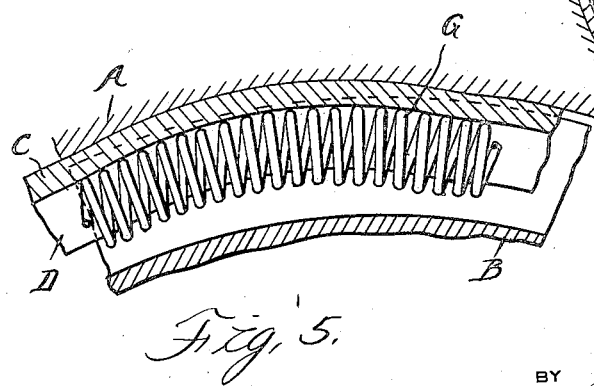
INVENTOR
Dean M. Solenberger
BY
ATTORNEYS Patented June 24, 1930

1,767,711

UNITED STATES PATENT OFFICE

DEAN M. SOLENBERGER, OF CLEVELAND, OHIO, ASSIGNOR TO THE SIMPLEX PISTON RING COMPANY OF AMERICA, INC., A CORPORATION OF OHIO

PISTON RING

Application filed October 29, 1928. Serial No. 315,868.

This invention relates to piston rings more particularly designed for use in connection with internal combustion engines in which in operation the cylinders are to a greater or less extent distorted from the true cylinder form. With such constructions a ring of circular form will not perfectly seal, as the humps or irregularities in the cylinder will hold portions of the ring out of sealing contact. One method of overcoming this defect is to form the rings sufficiently thin in radial thickness to be flexible and to then interpose between the ring and the bottom of the ring groove a corrugated ribbon expander. This results in a distributed radially outward pressure applied to the ring which will conform it to the irregular walls of the cylinder, thereby producing a seal. Inasmuch, however, as the reaction of the expander is between the ring and the bottom of the ring groove, and as ring grooves vary in depth, it is necessary to use a different expander for each variation in depth of groove in order that the radial pressure will be neither too great or too small for proper action.

It is the object of the present invention to obtain a simplified construction of ring and expander through which the ring will be conformed to irregular cylinders with a radial tension which is independent of the depth of the ring groove. To this end the invention consists in the construction as hereinafter set forth.

In the drawings:

Figure 1 is a longitudinal section through an engine cylinder showing a piston with my improved ring in sectional elevation;

Figure 2 is a horizontal section on line 2—2 of Figure 1;

Figure 3 is an enlarged elevation showing the manner of joining the ends of the expander;

Figure 4 is an enlarged sectional perspective view of a portion of the ring and expander, and Figure 5 is a diagram showing to an exaggerated degree the manner of conforming the ring to an irregular cylinder.

Figure 6 is a view similar to Figure 2 showing a modified construction.

As shown in Figures 1 and 2, A is an engine cylinder of any suitable construction, B the piston and C, C' and $C^2$ a series of rings engaging grooves in the piston in the usual manner. These are not, however, of the usual type but are constructed as follows:

My improvements are applicable to either rings expansible in a radial direction only or to axially resilient rings which combine both radial expansion and axial expansion. In the drawings I have shown rings of both types, the ring C being of the former and the rings C' and $C^2$ of the latter. In each case the ring is provided on its inner side with a groove D which is of such a depth as to leave a comparatively thin section E between the same and the peripheral surface. The groove is of such a width as to leave only comparatively thin tapering side flanges F and F'. Thus the ring is highly flexible and is capable of being distorted from a true circle to a form corresponding to that of the cylinder.

As has been stated the means usually employed for radially expanding the ring is a corrugated ribbon expander bearing alternately upon distributed points in the ring and intermediate points on the bottom of the ring groove. The tension of such an expander is dependent first on its inherent characteristics such as the thickness of the ribbon from which it is formed and depth of corrugation, and second, on the depth of the ring groove in which it is placed. Variations in the latter factor will alter the tension of the expander and consequently in adjusting a ring to a piston it is necessary first to measure the depth of the groove and then to select an expander which will develop the desired radial outward pressure. This in turn necessitates carrying in stock a large number of expanders of different construction and also involves the work of measuring the ring groove and the judgment of the workman in selecting the proper expander. My improved construction is designed to develop the desired radial expansion entirely by inherent characteristics of the expander and independent of any depth of ring groove. It is a further object to distribute this radial outward pressure around the circumference of the ring so that the ring will be flexed to conform to any irregularity in the cylinder wall and will be pressed against said wall with a substantially uniform pressure at all points in its circumference.

In detail, my improved expander preferably comprises a coil spring G which is of a diameter to fit within the groove D and to be free from contact with the bottom of a ring groove of minimum depth. The ends of the coils are joined to each other in any suitable manner such as indicated in Figure 3. The two end portions G' and G² are intertwined with each other. This may be accomplished by first twisting the coil to place the same under tension and screwing the two ends together when the tension is released. The amount of the overlap will determine the circumferential length of the coil, when placed within the ring and when the latter is contracted to fit within the cylinder. Thus by increasing or decreasing the amount of overlap the tension may be altered without changing the coil. Moreover, this tension is entirely independent of the depth of the ring groove and is determined solely by the inherent characteristics of the expander coil.

In installing the rings the only conditions to be considered are the diameter of the cylinder and the radial tension which it is desired to develop. As the radial tension is dependent solely upon the length of the coil springs before its ends are joined, it is unnecessary to carry in stock a large variety of expanders as all are made from the same coiled stock.

In Figure 6 I have shown a modified construction where in place of the coil G I use a corrugated ribbon expander H but one which is limited in depth of corrugations so that it will always be free from contact with the inner wall of the ring groove. The ends of this corrugated expander are connected to each other by any suitable means such as by overlapping or riveting as indicated at H'. With this construction, as with the one previously described, the expansive effect is dependent solely upon the expander and is not effected by difference in depth of ring groove.

The constructions thus far described is of a ring which is expansible in a radial direction only. When, however, it is desired to expand the ring axially to effect a more perfect sealing, I may employ the usual construction of a circumferentially slotted ring which is, however, provided with a groove D as previously described. Thus as shown the rings C' and C² are each provided with staggered series of circumferential slots I and I' which impart thereto axial resiliency.

In operation the rings are extremely flexible due to the thinness of the section E and therefore will be readily conformed to irregularities in the surface of the cylinder. At the same time the flanges F and F' are of sufficient depth to insure sealing contact with the side walls of the ring groove even where the piston only loosely fits the cylinder.

What I claim as my invention is:

1. A sealing ring comprising a trans-split ring member grooved in its inner peripheral face to form a U-shaped cross section and a circumferentially expansible flexible annular expander engaging said groove and subjecting said ring member to a distributed radial outward pressure as the resultant of its circumferentially expansive force, said expander being adjustable in circumferential length to alter its tension.

2. A sealing ring comprising a ring member grooved in its inner peripheral face to form a U-shaped cross section with exceedingly thin peripheral and side walls and a coil spring expander having its ends adjustably connected to each other to form an annulus of variable diameter whereby any desired degree of radial outward tension upon said ring may be obtained to conform the same to a distorted cylinder.

3. A sealing ring comprising a ring member of U-shaped cross section and with the peripheral and side walls thereof restricted in thickness to impart a high degree of flexibility for distortion from a circular form, and an expander located in the groove formed of coiled resilient wire having its ends intertwined to form an annulus, the circumferential length of said annulus being determined by the initial length of the coil and the amount of overlap and being selected to produce a pre-determined radial outward expansion of the ring to conform the same to the cylinder.

4. A sealing ring comprising a trans-split ring member grooved in its inner peripheral face to form a U-shaped cross section and to impart a high degree of flexibility for distortion from a circular form, the sides of said ring being a sufficient radial depth to insure sealing contact with the side walls of the ring groove and an endless circumferentially expansible expander located in the groove within said ring and being of sufficient tension solely through its circumferential expansion to conform said ring to a non-circular cylinder.

In testimony whereof I affix my signature.

DEAN M. SOLENBERGER.